United States Patent [19]

Feldy et al.

[11] 4,129,816

[45] Dec. 12, 1978

[54] STEPPING MOTOR CONTROL CIRCUIT

[75] Inventors: Edmund C. Feldy, Evanston; Dennis L. Stephens, Niles, both of Ill.

[73] Assignee: Teletype Corporation, Skokie, Ill.

[21] Appl. No.: 823,310

[22] Filed: Aug. 10, 1977

[51] Int. Cl.$^2$ .......................................... H02K 37/00
[52] U.S. Cl. .................................................. 318/696
[58] Field of Search ................ 318/138, 254, 685, 696

[56] References Cited

U.S. PATENT DOCUMENTS

| 3,573,593 | 4/1971 | Beery | 318/696 |
|---|---|---|---|
| 3,746,959 | 7/1973 | Kobayashi et al. | 318/696 |
| 3,760,252 | 9/1973 | Beery | 318/685 X |
| 3,893,012 | 7/1975 | Lin | 318/696 |
| 3,967,179 | 6/1976 | Loyzim | 318/696 |

Primary Examiner—Gene Z. Rubinson
Attorney, Agent, or Firm—W. K. Serp; J. C. Albrecht

[57] ABSTRACT

A stepping motor is described having two operative modes, the first mode being a normal rotary mode and the second a stationary mode. During rotary operation, the induced energy created by interruption of the current flow through the energized phase winding is dissipated quickly by a zener diode connected across the winding. In the stationary mode, a pulsed current is fed to one of the phase windings of the motor to assure stationary positioning of the rotor. During stationary operation, the zener diode is shunted with a second conventional diode providing a low impedance path to the current induced in the phase winding upon de-energization. This low impedance path greatly reduces the energy dissipated during the off condition of the pulsed current thereby greatly reducing motor power requirements during stationary operation.

5 Claims, 2 Drawing Figures

STEPPING MOTOR CONTROL CIRCUIT

This invention generally relates to an apparatus for controlling the operation of a stepping motor and more particularly to the control of a stepping motor in its stationary mode of operation during which the rotor of the motor is held in a fixed position by a magnetic field created by a pulsed current through the stator of the motor.

BACKGROUND OF THE INVENTION

Stepping motors may be grouped into two general categories, that is, those having magnetically permeable rotors, i.e., reluctance rotors and those having permanent magnet rotors. Although the following description relates to the control of a permanent magnet motor, the circuitry will find similar application when used with variable reluctance motors. The windings of a stepping motor are usually mounted with their axis radially oriented around the rotor and fixed to the stator of the motor. Several windings are spaced about the stator and selectively energized to position the rotor in a predetermined angular position with respect to the windings. In a permanent magnet motor, the rotor moves so as to place a permanent magnet pole as close as possible to the opposite pole generated electromagnetically by an appropriate winding.

In a printing device of the type disclosed in U.S. Pat. No. 3,982,622, granted on Sept. 28, 1976, to J. A. Bellino et al., paper is fed across a print head by a platen rotatably driven by a stepping motor. The paper is advanced by the motor to the desired line position and once this position is attained, the paper must be held firmly in place during printing. The residual magnetic attraction between the rotor and stator of the motor in its de-energized condition is generally insufficient to hold the platen and paper firmly in place. To assure secure positioning of the platen during printing, a current is passed through the appropriate stator winding generating a magnetic field. Under such conditions the required current through the winding is considerably less than that necessary to produce rotation of the motor. Thus, the energy supplied to the motor during stationary operation is reduced to minimize power consumption and reduce motor heating. One method of attaining this end is to insert a resistance in series with the winding. However, such an arrangement dissipates considerable power in the resistor. Alternatively, the source voltage is periodically interrupted to reduce the average current flow through the winding. The rapid interruption of voltage to the inductive stator winding generates induced voltages which, if not clamped, may reach extremely high levels possibly destroying various components of the motor control circuit. During normal rotary operation such clamping is often provided by a zener diode which quickly dissipates the induced energy in the de-energized winding as described in U.S. Pat. No. 3,760,252, entitled "Damping Of A Step Servo Motor Using One Step Anticipation Logic" issued Sept. 18, 1973, to J. M. Berry. However, during stationary operation, when the winding current is chopped, such zener clamping is undesirable since a rather large amount of the energy supplied to the coil is dissipated by the zener diode. The following embodiment provides a circuit for quickly dissipating the induced energy in the stator winding of a stepping motor during normal rotary operation and for reducing this energy dissipation during stationary operation thereby raising the operational efficiency of the motor.

SUMMARY OF THE INVENTION

A stepping motor control circuit includes a plurality of phase windings which are successively energized during rotary operation. During stationary operation, at least one of the phase windings is energized with a pulsed current. In accordance with the preferred embodiment means are provided for dissipating the energy in the pulsed windings upon de-energization. The dissipating means includes means for selectively reducing the energy dissipated by the dissipating means during stationary operation to a lower value than during rotary operation.

Advantageously, the average current through the first winding is thus increased during stationary operation, and operational efficiency is increased.

More particularly, the dissipation means exhibits a predetermined voltage drop through which the current produced by the de-energization of said winding passes and the reducing means serves to reduce the predetermined voltage drop during stationary operation.

As illustrated, the dissipating means includes a first diode connected across the first winding with the reducing means being in the form of a second diode selectively connected in parallel with the first diode during stationary operation. The second diode has a lower threshold voltage than the first diode. A transistor is included with the second diode connected in series with the collector-emitter junction of the transistor across the first diode. The transistor is selectively switched on during stationary operation of the motor.

Other features and advantages of this invention will be more fully appreciated after reference to the following description and drawings.

DETAILED DESCRIPTION

Rotary Mode

Figure 1:
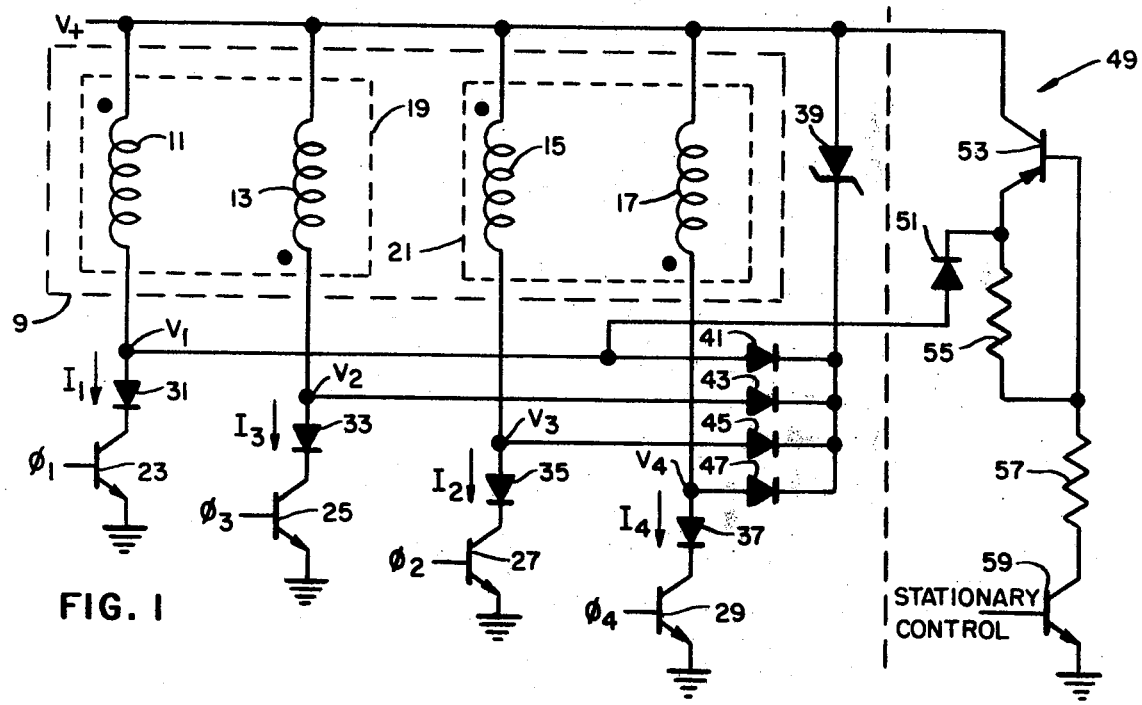
FIG. 1 is a schematic diagram of a stepping motor control circuit including certain features of this invention.

Illustrated in FIG. 1 is a control circuit for a four phase permanent magnet stepping motor including a stator 9 and a rotor (not shown). The stator 9 includes four individually excited coil windings designated 11, 13, 15 and 17. It will be appreciated that during normal rotary operation of the motor the windings are successively energized causing the rotor to step. As indicated, windings 11 and 13 are illustrated in a dotted rectangular box 19 and coils 15 and 17 are illustrated in dotted box 21. This representation is used to illustrate the close coupling between coils 11 and 13 and between 15 and 17. While there exist some coupling between the remaining coil pairs, the magnitude of this coupling is substantially small and may be ignored for purposes of the following discussion. The relative polarity of the windings 11, 13, 15, and 17 is illustrated by means of conventional dot notations.

Each of the windings 11, 13, 15, and 17 are separately energized by NPN switching transistors respectively designated 23, 25, 27, and 29. With respect to coil 11 the transistor 23 emitter is grounded with the collector thereof connected to the cathode of a transistor protection diode 31 the anode of which is connected to one terminal of the winding 11. The remaining terminal of the winding is connected to the positive terminal V+ of a power source. The current in winding 13 is switched by means of the switching transistor 25 in series with a protection diode 33. The current through winding 15 is controlled by the series NPN switching transistor 27 and a diode 35 combination. A protection diode 37 is in series with the winding 17 and the transistor 29. Progressively advancing phase control signals $\phi_1$, $\phi_2$, $\phi_3$, and $\phi_4$ are respectively fed to the bases of the transistors 23, 27, 25, and 29 which switch current through the respective motor windings. The phase control signals $\phi_1$, $\phi_2$, $\phi_3$, and $\phi_4$ may be provided by any suitable timing circuitry such as a programmed logic array or microprocessor in a manner well known to those skilled in the art.

It will be appreciated that upon turn off of an energized winding the inductance of the winding will attempt to maintain constant current flow through the winding ($E = L\, di/dt$). That is, the coil, upon interruption of the voltage to it, will act as a current source. Serving to prevent the creation of excessively high voltages upon current interruption through the windings is a zener diode 39 the anode of which is connected to the V+ terminal of the power source. The cathode of the zener diode 39 is connected to each of the windings 11, 13, 15, and 17 through isolating diodes 41, 43, 45, and 47. It will be appreciated that upon interruption of the voltage to the previously energized winding inductive current will be forced through the zener diode 39 with the reference voltage of the diode determining the time period required to fully dissipate the energy stored in the switched winding. It will be appreciated that the higher the zener diode 39 reference voltage, the faster the energy will be dissipated. The upper limit in the selection of the zener reference voltage is generally determined by the breakdown voltage of the switching transistors, 23, 25, 27, and 29. That is, the zener reference voltage plus the drive voltage V+ cannot be greater than the breakdown potential of the switching transistors taking into consideration an appropriate safety factor. The lower limit of the zener reference voltage being one that provides the desired power dissipation time interval.

Figure 2:
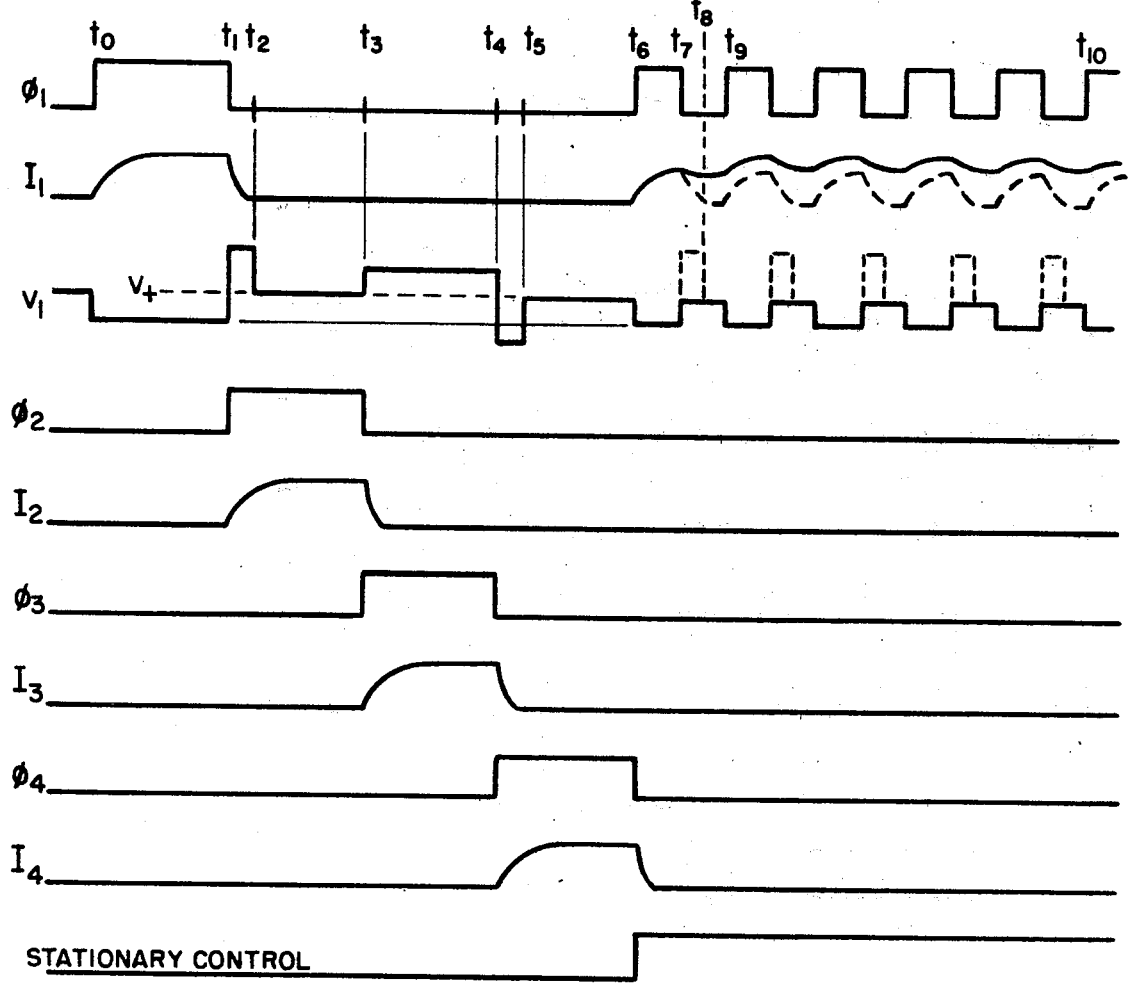
FIG. 2 is a timing diagram of selected signal levels of the circuit of FIG. 1.

With reference to FIG. 2 during time period $t_0$ through $t_6$ the signals generated during normal rotational operation of the motor are illustrated. The winding 11 is energized during time period $t_0$ through $t_1$ and during this interval a positive pulse $\phi_1$ is applied to the transistor 23 which turns the transistor ON bringing the lower terminal of the winding 11 (voltage level $V_1$) to substantially ground potential. Due to the inductance of the winding 11, the current therethrough $I_1$ gradually increases until it reaches a fixed level determined by the winding 11 resistance. At time $t_1$ the transistor 23 is switched OFF and the winding 11 becomes a current source attempting to maintain a constant flow. Thus voltage $V_1$ rises until the zener diode 39 breaks down. The voltage $V_1$ remains at this level until $t_2$, that is, until the energy stored in the winding 11 is dissipated by the zener diode 39 and thereafter falls to the source supply voltage V+ at $t_2$. At time $t_3$ the input signal $\phi_3$ to transistor 25 goes high turning ON the transistor 25 initiating current flow through winding 13. The change of winding 13 is coupled to winding 11 raising the voltage level $V_1$. Since $V_1$ is now greater than V+, there is a tendency for a current to be induced in coil 11. This induced current does not occur unless the difference between $V_1$ and V+ is greater than the zener diode voltage. At time $t_4$, $\phi_3$ goes low and the lower terminal of coil 13 rises. This voltage rise is coupled to coil 11 with reverse polarity bucking the V+ supply voltage and voltage $V_1$ falls to minus level. At $t_5$ switching transistor 29 is turned ON initiating current flow through winding 17. During the sequential de-energization of the windings 15, 13, and 17 the induced current in each winding passes through its respective isolation diode 45, 43, or 47 to the zener diode 39 which quickly dissipates the energy stored in the winding. In this mode of operation, similar changes in $V_2$, $V_3$, $V_4$ will occur as transistors 25, 27, and 29 are turned ON.

Stationary Mode

Returning now to FIG. 1, the portion of the circuit diagram illustrated to the right of the dotted line is a switching circuit 49 used during the stationary mode of operation of the motor and serves to reduce power consumption of the motor while maintaining a magnetic field sufficient to hold the rotor stationary. As previously mentioned, in the stationary mode coil 11 is energized. It has been found that the amount of current necessary to hold the motor rotor stationary is substantially less than that necessary to maintain rotary operation. Thus, in the stationary mode of operation the voltage to the winding 11 is pulsed by a pulsating signal $\phi_1$ at the base of the transistor 23 from time to $t_6-t_{10}$. The average amount of power delivered to the winding 11 is substantially less than would be supplied were the switching transistor 23 maintained in a steady ON condition.

The switching circuit 49 shunts the zener diode 39 with a conventional silicon diode 51 having a much lower threshold voltage, e.g., 1 volt. The collector of a PNP switching transistor 53 is connected to the V+ supply and the emitter of the transistor 53 is connected to the cathode of the diode 51. The anode of the diode 51 is connected to the lower terminal of the winding 11. Additionally, a biasing resistor 55 is connected between the emitter and the base of the transistor 53 with the transistor base coupled through a current limiting resistor 57 to the collector of a NPN control transistor 59. The emitter of the control transistor 59 is connected to ground and a stationary control signal is fed to the base of the transistor 59. When the current through the winding 11 is pulsed during stationary operation, a continuous control signal is fed to the base of the transistor 59. It will be appreciated that when the control signal is applied to the control transistor 59 the collector thereof is brought substantially to ground potential and a current path is provided from the lower terminal of winding 11 through the diode 51. During the OFF condition of the transistor 23, current will flow through the emitter collector junction of the transistor 53 as well as through the biasing resistor 55 biasing the transistor 53 ON and effectively placing the diode 51 in parallel with the zener diode 39. Thus, two diode junction voltage drops are placed across the zener diode 39. A first junction voltage drop is provided by the diode 51 and a second by the emitter collector junction of the transistor 53.

Referring to FIG. 2, during the stationary mode of operation starting at time $t_6$ the input $\phi_1$ to the transistor 23 is pulsed and when the transistor 23 turns ON, the voltage $V_1$ at the lower terminal of the winding 11 falls to substantially ground potential and the current $I_1$ through the coil rises. For purposes of discussion it will be assumed that the switching circuit 49 is inoperative. Upon turn OFF of the transistor 23, the energy stored in the winding 11 will quickly drop due to the current flow through the zener diode 39. The zener reference voltage multiplied by the current flow determines the power dissipation which in this instance is relatively high. Upon turn ON of the transistor at $t_6$ the current $I_1$ through the winding will rise and generate the dotted sawtooth current waveform illustrated in FIG. 2. It will be appreciated that the voltage across the coil 11 generated by the switching of the transistor 23 is coupled to winding 13 with inverted polarity. Thus, while the zener diode 39 provides an energy discharge path for winding 13 the isolating diode 43 connected to winding 13 is back biased preventing current $I_3$ from flowing through the zener diode 39. Similarly diodes 45 and 47 will prevent current flow through the remaining windings 15 and 17 during stationary operation. Additionally, with the switching circuit 49 disabled, voltage spikes will be generated as indicated by the dotted lines from $t_7$–$t_{10}$ of the voltage $V_1$ in FIG. 2 limited in level by the zener diode 39. It will be appreciated that with the switching circuit 49 disabled the average current through the winding 11 is the average of the dotted sawtooth current waveship $I_1$ of FIG. 2.

Upon the application of the control signal to the base of the transistor 59, the switching transistor 53 will turn ON as the current $I_1$ through the winding 11 increases. Upon turn OFF, the voltage across the winding 13 rises attempting to maintain the previous level of current flow with the positive voltage polarity being the lower end of the winding 11. Current flows through the diode 51 and through the emitter base junction of transistor 53 as well as through the resistor 55 turning the switching transistor 53 ON. The series impedance of the transistor 53 and the diode 51 is considerably less than the impedance of the zener diode 39 which is therefore effectively bypassed. Since the winding 11 acts as a current source and the diode 51 transistor 53 combination present a relatively low impedance, the transistor-diode combination will dissipate very little power with the current falling very slowly, as illustrated by the solid line from $t_6$–$t_{10}$ of the current $I_1$ of FIG. 2. At $t_9$ the transistor 23 is again turned ON and the current flows through the winding 11. The process continually repeats. It will be appreciated that the average current with the switching circuit 49 activated is substantially higher than the average current without the switching circuit. Thus, although the average pulsed power supplied to winding 11 is the same in both instances a considerably higher average current is maintained through winding 11 when the switching circuit 49 is active resulting in the generation of a greater magnetic field by the stator 9. Thus, the switching circuit 49 directs current around the zener diode 39 during the stationary mode of operation substantially raising the efficiency of the control circuit.

Although this invention has been shown and described with reference to a preferred embodiment thereof, it will be understood that various changes in form and detail may be made without departing from the spirit and scope of the invention as set forth in the following claims:

What is claimed is:

1. In combination with a stepping motor having a plurality of stator phase windings each being successively energized during rotary operation with at least a first one of the phase windings being energized over a predetermined time period with a pulsed current during stationary operation and means for dissipating the induced energy in at least said first winding upon de-energization, the improvement comprising:
   means for selectively reducing the energy dissipated by said dissipating means during stationary operation to a lower value than during rotary operation so as to increase the average current through said first pulsed winding and thus the operational efficiency of the combination.

2. The apparatus of claim 1 wherein said dissipating means exhibits a predetermined voltage drop through which the current produced by the de-energization of said first phase-winding during rotary operation passes and wherein said reducing means serves to reduce said predetermined voltage drop during stationary operation.

3. The apparatus of claim 2 wherein said dissipating means comprises a first diode connected across said first coil and a second diode selectively connected in parallel with said first diode by said reducing means during stationary operation, said second diode having a lower threshold voltage than said first diode.

4. The apparatus of claim 3 wherein said reducing means comprises a switch responsive to the operative mode of the motor and serve to connect said second diode across said first diode during stationary operation of the motor.

5. The apparatus of claim 4 wherein said switch comprises a transistor with said second diode being connected in series with the collector-emitter junction of the transistor and the series diode-transistor combination being connected across said first diode.

* * * * *